Feb. 7, 1933. A. J. SMITH 1,896,870
METHOD OF AND APPARATUS FOR THE MANUFACTURE OF BLOWN GLASSWARE
Filed June 2, 1928 3 Sheets-Sheet 1

Witness:
A. A. Horn

Inventor
Algy J. Smith
by Robson O'Brown
Attorney.

Feb. 7, 1933.   A. J. SMITH   1,896,870
METHOD OF AND APPARATUS FOR THE MANUFACTURE OF BLOWN GLASSWARE
Filed June 2, 1928   3 Sheets-Sheet 2

Witness:
A. A. Horn.

Feb. 7, 1933. A. J. SMITH 1,896,870
METHOD OF AND APPARATUS FOR THE MANUFACTURE OF BLOWN GLASSWARE
Filed June 2, 1928 3 Sheets-Sheet 3

Patented Feb. 7, 1933

1,896,870

UNITED STATES PATENT OFFICE

ALGY J. SMITH, OF HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR THE MANUFACTURE OF BLOWN GLASSWARE

Application filed June 2, 1928. Serial No. 282,388. REISSUED

This invention relates to the manufacture of blown glassware, and it has particular relation to the manufacture of electric lamp bulbs, lamp chimneys, tumblers and the like, from glass delivered in a continuous stream from a source of supply of molten glass.

The present invention is closely related to but distinguished from that system of glass manufacture which causes a ribbon or strip of glass to be deposited upon a rotary support having orifices through which the glass to form the articles is caused to descend, the glass for each article being blown in a mold while still attached to the supply ribbon or strip. An organized machine for use in carrying out such system of glass manufacture is disclosed and claimed in the copending prior application of Robert W. Canfield, Serial No. 176,988, filed March 21, 1927, now Patent No. 1,807,566, issued May 26, 1931. The rotary support of that machine comprises a series of apertured plates, termed orifice plates, arranged side by side around the edge of a rotary table which also carries a convenient number of blow molds below the level at which the glass is deposited on the orifice plates. The table also carries above the level of the glass, blow heads which cooperate with the molds to expand the glass therein. A continuous stream of glass from a source of supply is shaped into a succession of relatively thick and rounded sections, which later form parisons for the articles to be made, connected by relatively thin and flat sections which are ultimately discarded as cullet. The ribbon or strip of glass, thus preliminarily shaped, is deposited on the revolving series or orifice plates so that the relatively thick portions of the ribbon or strip are deposited over the orifices of the rotary support and each is allowed to remain there a short time so as to sag down somewhat through an orifice and form a parison. The parison is subsequently blown to final form and shaped by the conjoint action of pressure fluid admitted through a blowhead and a blow mold in which the parison is received during part of the blowing operation, and such blow mold is rotated while the glass is received therein so as to give a smooth finish to the outer surface of the blown article. After the finished articles have been completely fabricated, they are disconnected from the parent ribbon or strip of glass and the remaining glass of such strip or ribbon is removed as cullet.

An object of the present invention is to materially reduce the amount of glass that has heretofore been discarded as cullet when a stream of glass is deposited on a horizontally moving support so as to provide glass for the manufacture of electric light bulbs or similar articles of blown glassware.

A further object of the invention is to manufacture a series of articles of blown glassware from successive portions of a glass stream deposited on a continuously moving support over orifices of such support without the necessity of flattening such stream to a ribbonlike form or otherwise effecting a preliminary shaping of the stream prior to or at the time of deposit of said stream on said support.

A further object of the invention is the provision of an improved method of and apparatus for forming blown glassware from a continuous stream of molten glass, whereby successive portions of a downwardly moving stream of glass are deposited on a series of horizontally movable apertured supporting members in turn and are severed from the stream for fabrication into articles of blown glassware.

A further object of the invention is to provide an improved mechanism for forming a portion of glass severed from a continuous stream into a parison and adapted, in one embodiment thereof, to rotate the parison while it is being blown in a mold so as to give a smooth and regular external contour to the blown article.

A still further object of the invention is to provide a novel head structure which combines means for both pressing glass downwardly into a blank mold to form a parison and for subsequently directing pressure fluid into the parison to expand it to final form.

Other objects and advantages of the invention will be apparent from the following description, when considered in conjunction with the accompanying drawings.

The following operations will take place in the fabrication of blown glassware by means of apparatus now preferred by me and to be hereinafter described. A continuous stream of molten glass, which may be of circular or other cross section according to the cross section of the feed outlet and suitably regulated as to its size, viscosity and rate of flow, is delivered downwardly onto each of a series of substantially funnel-shaped supporting members as such supporting member is brought by a rotary support to the glass-receiving station. The glass deposited on each supporting member will be severed from the supply stream as the supporting member is moved away from the glass-receiving station, and the severed end of the stream will be deposited on the succeeding supporting member as the latter is moved to the glass-receiving station. The respective supporting members preferably are disposed sufficiently close to one another to prevent the severed end of the stream falling between adjacent supporting members, and an upwardly directed stream of pressure fluid or flame may be provided to support the severed end of the stream after each severing operation as the succeeding supporting member moves to a glass supporting position at the glass receiving station. The severed portion of the stream deposited on each of the funnel-shaped supporting members begins to sag through the underlying orifice into a blank mold which has been brought to a glass-receiving position at the lower end of the orifice of the supporting member. A combined press and blowhead is moved downwardly into pressing relation to the glass on the supporting member and presses the glass downwardly in the underlying blank mold. The glass deposited on each supporting member thus is formed into a parison which remains attached at its upper end to the supporting member. After the parison has been formed, the blank mold is removed. The glass parison then may be permitted to sag slightly, and a predetermined volume of pressure fluid is admitted slowly through the combined press and blowhead to expand the parison somewhat while it is in suspension from the orifice of the funnel shaped supporting member. A blow mold then is brought to position to receive the parison beneath the supporting member and finish blowing air is directed from the combined press and blowhead through the orifice of the supporting member into the parison in the blow mold and the parison is expanded into an article of blown glassware. Provision may be made for causing relative rotation of the parison and the blow mold while such parison is being blown to final form in the blow mold, thereby giving a smooth finish to the outer surface of the finished article. The blowhead and blow mold then are removed and the blown article is detached from the supporting member which then may be brought again to position to receive another portion of the stream of glass at the charging station, thus initiating a new cycle of operations of the machine.

Figures 1, 2, 3:
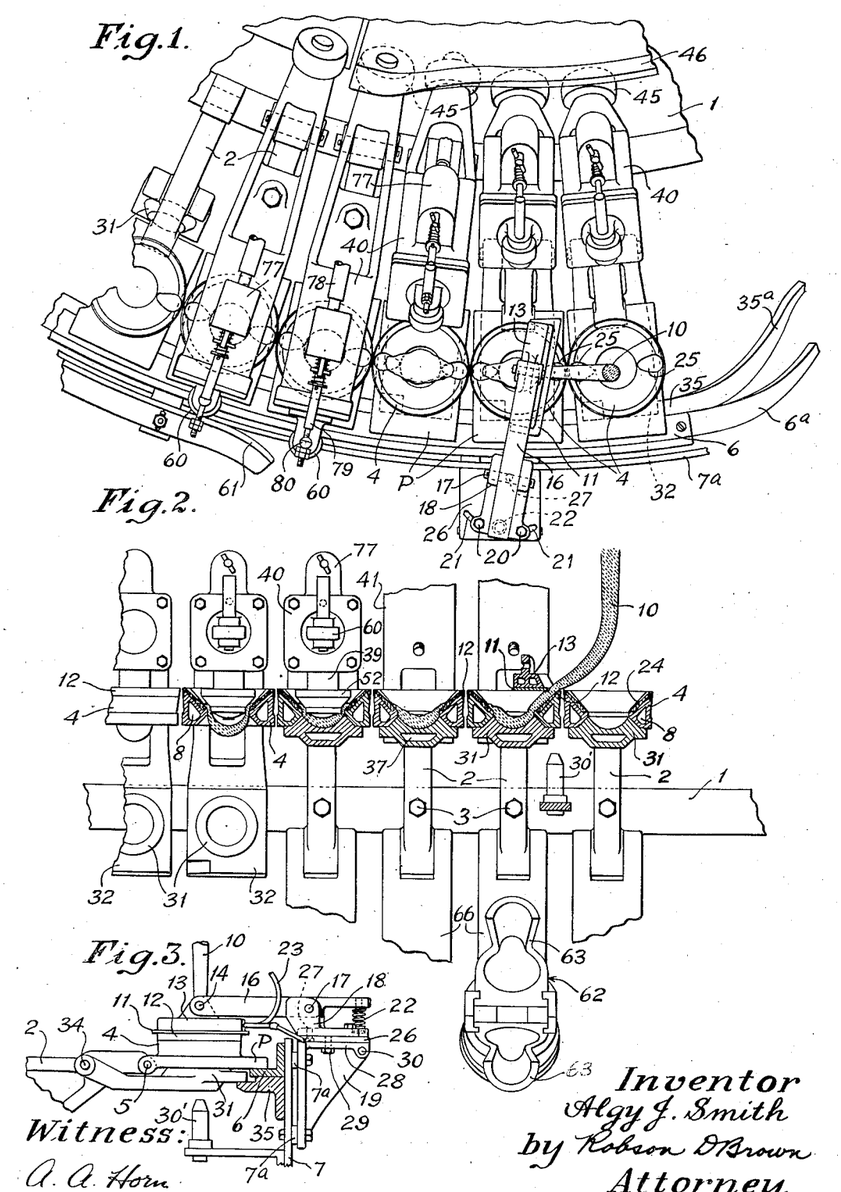
Figure 1 is a plan view of a fragmentary portion of a glass fabricating machine embodying features of the present invention.
Fig. 2 is a view, mainly in elevation and partly in vertical section, showing the apparatus exhibited in Fig. 1 with certain parts thereof omitted for the purpose of clearness.
Fig. 3 is a fragmentary view, partly in side elevation and partly in vertical section, illustrating particularly the cooperative relations with one another of a blank mold, a funnel shaped supporting member and a fixed shear for severing the glass deposited on the supporting member from the supply stream.
Figure 4:
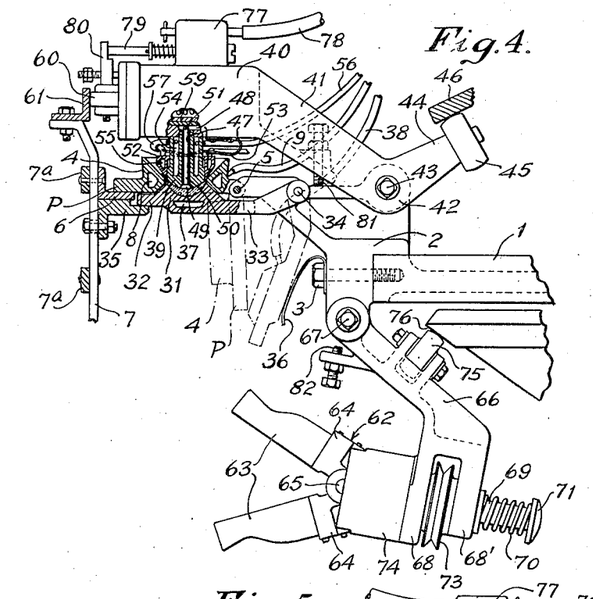
Fig. 4 is a fragmentary view, mainly in side elevation but partly in vertical section, showing in full lines the active positions of a funnel shaped supporting member, a blank mold and the combined press and blowhead and the inactive position of the blow mold, and showing in dotted lines the inactive positions of the supporting member and the blank mold.
Figure 5:
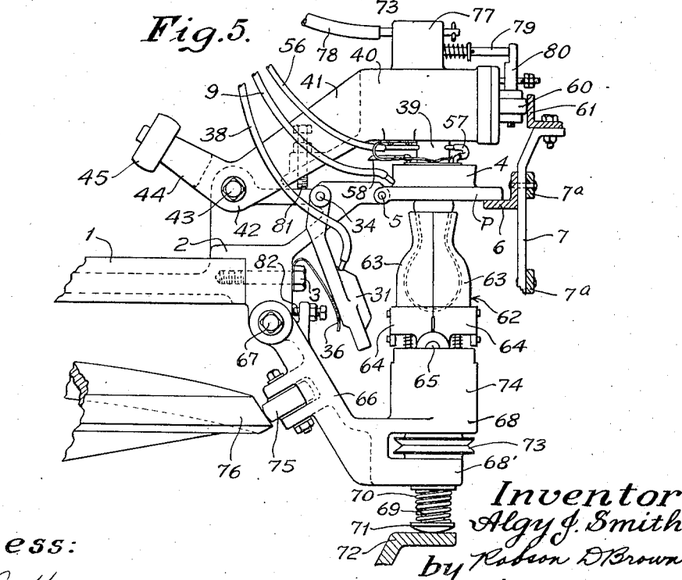
Fig. 5 is a view similar to Fig. 4, showing the blank mold in its downwardly swung inactive position and the blow mold in its upwardly raised active position.

A machine embodying the invention, and in the form now preferred by me, may comprise a rotary table 1, which may be mounted for rotation about a vertical axis by any suitable means and operated in any suitable known manner. The table 1 carries a series of brackets 2, arranged side by side around the edge thereof and secured to the table by suitable fastening devices, such as the screw 3 (Figs. 2, 4 and 5). A funnel-shaped supporting member 4 is provided for each bracket 2. This supporting member may be an integral part of an orifice plate P that is connected at its inner end by horizontal pivot element 5 with an upward extension on the bracket 2, as clearly shown in Figs. 4 and 5. The outer end of each orifice plate slides on a rail 6 which is carried by suitable supporting means, as by uprights such as indicated at 7 in Figs. 3, 4 and 5. The uprights 7 may be connected and braced by rails or bands 7a. The rail 6 may have downwardly and inwardly curved portions, such as indicated at 6a in Fig. 1, for guiding the orifice plate between a downwardly swung inactive position, as shown by the dotted lines in Fig. 4, to its raised active position, as shown by the full lines in Figs. 3, 4 and 5.

The supporting member 4 is formed so as to have a cooling chamber 8 through which a cooling fluid may be circulated from a supply pipe 9. Each supporting member 4 is brought by the rotation of the table 1 to position to receive glass from a continuous stream 10 (Fig. 2). The cavity of the funnel shaped supporting member may be lined with a suitable material, such as brush carbon or other graphite material, as indicated at 24 in Fig. 2, to which glass will not stick when the supporting member is relatively hot. The wall of the upper part of the cavity of each supporting member is provided at diametrically opposite places with depressions or concavities 25, Fig. 1. These concavities are located along a circle having its center in the axial line about which the table 1 rotates. As each supporting member 4 moves to its glass receiving position, the lower end of the glass stream is deposited in the adjacent concavity 25 and the continued movement of the supporting member across the glass receiving station and the downward movement of the glass stream causes the lower end portion of the glass stream to be laid across the cavity of the supporting member into the concavity 25 at the opposite side of the latter. The deposited portion of the glass stream will be severed from the supply stream as the supporting member is moved to the left in Fig. 2 from the position occupied by the supporting member second from the right in such view and will comprise sufficient glass to form the desired article of hollow glassware. This severance of the glass on the supporting member 4 from the supply stream is effected by the coaction of a horizontally disposed normally stationary shear blade 11 (Figs. 1 and 2) and a cooperating hardened steel shear member 12 at the edge of the supporting member, the latter wiping across the lower surface of the stationary blade as the supporting member 4 is moved away from the glass receiving station.

The shear blade 11 is carried by a holder 13 connected by a horizontal pivot 14 with a lever 16 which is fulcrumed at 17 on a horizontal pivot element carried by a bracket 18. The bracket 18 is supported on a bracket 19 carried by the supporting structure 7—7a, so as to be angularly adjustable or swingable about both horizontal and vertical axes. As shown in Figs. 1 and 3, the bracket 18 rests upon an intermediate connecting plate 26. A vertical pivot element 27 connects the bracket 18 and the plate 26. The bracket 18 can be adjusted angularly about the axis of the pivot element 27, when bolts 20 which work in a slot 21 (Fig. 1) are loosened, so as to adjust the sheer blade 11 on the top of the supporting member 4 at the glass receiving station for proper shearing contact with the shear member 12 of such supporting member as the latter moves past the glass receiving station. Tightening of the bolts 20 will secure the bracket 18 against accidental angular turning movement on the plate 26. The plate 26 is secured in place on a hinge plate 28 by suitable fastening means, as 29 (Fig. 3). The hinge plate 28 is connected at its outer end to an arm of the bracket 19 by a horizontal pivot element 30 and normally is maintained in horizontal position by reason of the contact of its inner end with the body of the bracket 19, whereby the blade 11 normally will be maintained above a supporting member 4 at the glass receiving station. A spring 22 is compressed between the bracket 18 and the outer end of the lever 16 and holds the blade 11 flatwise against the upper edge of the supporting member at the glass-receiving station without preventing upward movement of such shear blade should an unyielding object pass between the blade and the supporting member. The blade is kept relatively cool by circulating cooling fluid from a pipe 23 through the blade holder. Since the ends of the portion of the glass stream deposited on each supporting member 4 at the glass receiving station rest in the concavities 25, the wiping contact of the blade 11 with the upper edge of the supporting member 4 as the latter moves past the glass receiving station will effect severance of the deposited glass cleanly from the supply stream without smearing such glass across the edge of the supporting member and without tending to drag or displace the severed portion of glass from the position in which such glass was deposited.

When desired, the hinge plate 28 and all parts carried thereby may be swung about the axis of the pivot element 30 upwardly and outward from the position shown in Fig. 3 to an out of the way position to permit convenient access to the supporting member 4 at the glass receiving station, to permit convenient removal and replacement or adjustment of the blade 11 or any part of its supporting means, or for any other desirable purpose.

As each supporting member 4 moves past the glass receiving station after receiving its quota of glass from the supply stream, the severed end of the glass stream will sag toward the adjacent edge of the oncoming supporting member 4 and if desired, an upwardly directed blast of pressure fluid or flame from a discharge pipe 30' adjacent to the glass receiving station may be applied to the severed end of the stream to support it until the succeeding supporting member 4 is in the proper position to permit deposit of the end of the stream in a concavity 25 at one side of such supporting member. This supporting blast may also serve to reheat the end of the stream to eliminate any shear or chill marks in the glass.

Each bracket 2 carries a blank mold 31 which is moved at the proper times to and from position to cap the lower end of the associate supporting member 4. The blank mold 31 may be an integral part of a plate 32 which has arms 33 at its inner end connected by a horizontal pivot element 34 with the bracket 2. The outer end of the plate 32 slides on a cam rail 35 which may be carried by the uprights 7. The blank mold 31 is substantially horizontal when it is disposed in capping relation to the associate supporting member 4, as shown in Fig. 3 and in full lines in Fig. 4, and the rail 35 has downwardly and inwardly curved guide portions, as indicated at 35a in Fig. 1, for guiding the blank mold from its raised horizontal position to and from a downwardly swung out of the way position against a spring stop 36, as shown in Fig. 5, and by the dotted lines in Fig. 4. The plate 32 may be formed with a cooling chamber 37 adjacent to the blank mold and a suitable cooling fluid may be supplied to such cooling chamber through a flexible tube 38. When the blank mold is in its raised or horizontal position at the lower end of the associate supporting member 4, it will receive and support glass descending thereinto from the cavity of such supporting member.

A combined press and blow head 39 is supported on each bracket 2 for movement to and from position to enter the associate supporting member 4 from above. The combined press and blowhead 39 depends from a cylinder 40 which is carried by one arm 41 of a bell crank lever 42 that is fulcrumed at 43 on a horizontal pivot element carried by an upper extension of the bracket 2. The other arm 44, of the bell crank lever carries a roll 45 which is adapted to contact with a cam rail 46, Fig. 4, so that the combined press and blowhead 39 is moved at the proper times from an upwardly swung out of the way position, as shown for the first three press and blowhead structures from the right in Fig. 1, to a downwardly swung position in cooperative relation with the associated supporting member 4, as shown for the fourth and fifth press and blowhead structures from the right in Fig. 1, and as shown in Figs. 4 and 5. The supporting and controlling mechanism for the combined press and blowhead 39 may be substantially the same as the supporting and controlling mechanism for the blowhead disclosed in the aforesaid R. W. Canfield Patent No. 1,807,566.

As shown in Fig. 4, the combined press and blowhead 39 has a convexly curved lower end adapted when the press and blowhead is in its downwardly swung active position to depend through the lower end of the associate supporting member 4 to position to press the glass in the latter into intimate contact with the glass receiving cavity of the underlying blank mold 31 whereby such glass will be formed into a parison. The combined press and blowhead 39 has a central vertical passage 47 extending therethrough and communicating with a passage 48 in the inner wall of the cylinder 40. The lower end of the passage 47 is enlarged to provide a seat for the reception of a valve 49 having a rod-like stem 50 which extends slidably through the passage 47. A transverse pin 51 at the upper end of the stem 50 and above the end of the passage 47 cooperates with the end of the latter to limit the downward movement of the valve 49 from its seat. When the combined press and blowhead is moved downwardly from its inactive raised position to its active position against the glass in the associate supporting member 4, the contact of the glass with the valve 49 moves the latter upwardly against its seat so that the lower end of the passage 47 will be closed so long as the combined press and blowhead is in pressing relation to the glass in the underlying blank mold, as shown in Fig. 4. A sealing sleeve 52 is mounted for limited sliding movement on the lower end portion of the combined press and blowhead. Spring fingers 53 carried by the cylinder 40 bear against the top of the sealing sleeve 52 and tend to maintain it at the limit of its possible downward movement on the combined press and blowhead, which limit may be determined by cooperative stop shoulders on the sealing sleeve and the combined press and blowhead, respectively. As the press and blowhead is moved downwardly from its inactive position into the associate funnel shaped supporting member 4, the lower end of the sealing sleeve 52 cooperates with the tapering lower portion of the member 4 to provide a limited space into which glass may be forced to form a suspending neck for the parison. The sleeve 52 also prevents the passage of glass above such limited space as the combined press and blowhead presses the glass downwardly into the underlying blank mold, as shown in Fig. 4. The combined press and blowhead may be formed with an annular cooling space 54 surrounding the passage 47 and the sealing sleeve 52 likewise may be made hollow so as to include an annular cooling space 55. A cooling fluid may be admitted to the annular cooling space 54 through a pipe 56 and after circulating in such cooling space may pass therefrom through a flexible tube 57 into the cooling space 55 in the sealing sleeve, from which such cooling fluid may escape through the pipe 58, Fig. 5.

A piston 59 may be reciprocated in the cylinder 40 by mechanism which may be substantially the same as disclosed in the aforesaid Canfield patent. Such mechanism may include a stem protruding from one end of the cylinder and carrying a roll 60 for contacting with a cam rail 61 tending to move the piston to the right in the cylinder 40 when the cylinder is in its downwardly swung position, as shown in Fig. 4. Such movement of the piston in the cylinder 40 tends to force pressure fluid through the passage 48 into the passage 47 of the combined press and blowhead. Preferably this movement of the piston to the right in the cylinder 40 will not commence until the blank mold 31 has moved downwardly from its glass supporting position, as shown by the full lines in Fig. 4, to its inactive downwardly swung position, as shown by the dotted lines in the same figure, and the glass parison has been permitted to sag downwardly sufficiently to permit the valve 49 to move downwardly by gravity. The pressure fluid passing into the combined press and blowhead then will be delivered from the lower end of the passage 47 around the valve 49 into the cavity of the parison and will impart a bulbous shape to the parison, as indicated for the parison second from the left in Fig. 2.

Each bracket 2 also supports a blow mold 62 which is moved at the proper time from a downwardly swung inactive position to a raised position below the associate supporting member 4. When the blow mold is in its raised position, it is adapted to inclose the parison as shown in Fig. 5. The blow mold and its supporting and operating mechanism may have substantially the same construction as disclosed in the aforesaid Canfield patent. Such blow mold comprises two halves or sections 63 carried by holders 64. The holders 64 are connected with each other and with suitable operating mechanism by a horizontal pivot element 65 so that the mold halves are opened and closed at the proper times to inclose the parison and to release a finished blown article and so that the blow mold may be rotated about its axis during the finish blowing of the parison therein. Such mold operating mechanism may comprise a supporting arm 66 connected by a pivot element 67 with a depending portion of the bracket 2. The arm 66 carries a pair of spaced bearings 68 and 68' respectively through which part of the mechanism for opening and closing the mold halves and for rotatably supporting the blow mold may extend, such mechanism including an axially movable rod 69 suitably connected with the mold holders so as to close the mold halves when the rod 69 is moved axially toward the mold halves from the position shown in Fig. 4 against the action of a spring 70 and to effect opening of the mold halves when the rod 69 is moved outwardly by the spring 70 from the position shown in Fig. 5 to the position shown in Fig. 4. The rod 69 may be formed with an enlarged head 71 formed with a convexly curved surface for contact with a cam 72 to effect closing of the mold halves at the proper time. The mold operating mechanism may also include a pulley 73 connected with the mold halves so as to rotate the blow mold when the pulley is rotated. The rotation of the pulley may be effected at the proper time by means such as disclosed in the aforesaid Canfield patent. Part of the mold operating mechanism may be housed in a sleeve 74 carried by the bearing 68 and cooperating with the mold holders so as to prevent opening of the mold halves except when such mold halves are disposed radially of the axis of rotation of the table 1.

A roll 75 on the arm 66 is adapted to contact with a cam 76 to swing the blow mold upwardly from its lowered inactive position, as shown in Fig. 4, to its raised position beneath the associate supporting member 4, as shown in Fig. 5, and the rod 69 of the mold operating mechanism then will be cammed upwardly by reason of the contact of its head with the cam 72 so as to close the mold halves or sections about the parison below the associate supporting member 4.

The finish blowing air may be supplied to the combined press and blowhead at the proper time by mechanism substantially the same as that disclosed in the aforesaid Canfield patent. Such mechanism may comprise a valve 77 communicating with the cylinder 40 and provided with a pressure fluid supply conduit 78 which may lead to any suitable source of supply of pressure fluid (not shown). The valve 77 may be opened at the proper time by reason of the inward movement of a rod 79 in the valve casing. Such inward movement of the rod 79 may be caused by the contact with the outer end thereof of an actuating arm 80 movable with the rod of the piston 59, substantially as fully illustrated and described in the aforesaid Canfield patent. The bell crank 42 may be provided with an adjustable stop 81 for contacting with the bracket 2 to limit the downward swinging movement of the combined press and blowhead toward the associate funnel member 4 and the blow mold supporting arm 66 may be provided with an adjustable stop 82 for contacting with the bracket 2 to limit the upward swinging movement of the blow mold toward the associate funnel member 4.

The operation of the machine, as described so far, is substantially as follows:

The rotation of the table 1 brings each funnel shaped supporting member 4 in its turn to a glass receiving station. As each supporting member 4 reaches such glass receiving station, the lower end of the glass stream from a source of supply falls into the concavity 25 at one side of the upper part of the cavity of the supporting member 4 and the end portion of the stream is laid transversely across the cavity of the supporting member 4 and into the concavity at the opposite side of the upper end of such cavity as shown in the supporting member 4 second from the right in Fig. 2. As such supporting member moves past the glass receiving station, the deposited portion of the stream is severed from the remainder of the stream by the conjoint action of the shearing members 11 and 12 and the lower end of the stream may be supported by the upwardly directed pressure fluid from the member 30′ until the next supporting member 4 reaches the glass receiving station. In the meantime, the glass in the supporting member 4 that has passed from the glass receiving station, settles in such supporting member and sags into the blank mold which has been brought to capping relation to the lower end of such supporting member as shown in the supporting member 4 third from the right in Fig. 2. As the movement of the supporting member away from the glass receiving station continues, the associate combined press and blowhead is swung downwardly to pressing relation to the glass in the supporting member 4, as shown for the supporting member 4 fourth from the right in Fig. 2, thus forming a parison in the blank mold.

The blank mold then is permitted to drop and the glass parison will begin to sag downwardly from the supporting member 4. The movement of the piston 59 in the cylinder 40 under the influence of the cam 61 then will take place so that a regulable volume of air will be discharged from the combined press and blowhead into the parison and will impart a bulbous form to such parison substantially as shown for the parison second from the left in Fig. 2. Further sagging of the parison will be permitted and at this time, the parison may be reheated by suitable burners (not shown), if desired, so as to retard the elongation of the parison under the action of gravity and to increase the lateral distention of the parison. As soon as the parison has assumed a configuration adapted to be enclosed within the blow mold, the blow mold is raised and the halves thereof are closed about the parison, as shown in Fig. 5. At this time, the valve 77 will be actuated so as to admit finish blowing air to the cylinder 40 and thence through the combined press and blowhead and supporting member 4 to the parison so that the parison will be expanded to final form in the blow mold. During this finish blowing operation, the blow mold may be rotated about the parison so as to impart a smooth finish to the outer surface of the finished article. After the finish blowing of the parison to final form has been completed the finished article may be detached from the supporting member 4 in substantially the same manner as disclosed in the aforesaid Canfield patent, and delivered to a suitable place. Since practically all of the glass deposited on the supporting member 4 will be utilized first in the formation of the parison and subsequently in the fabrication of the finished article, it will be apparent that but relatively little glass must be discarded as cullet after the finished article has been detached from such supporting member. Any glass remaining attached to the supporting member 4 after the delivery of the finished article may be dislodged from such supporting member in substantially the same manner as illustrated and described in the aforesaid Canfield patent and the continued rotation of the table 1 will again bring the supporting member 4 to its glass receiving position so as to initiate a new cycle of operations.

Figure 6:
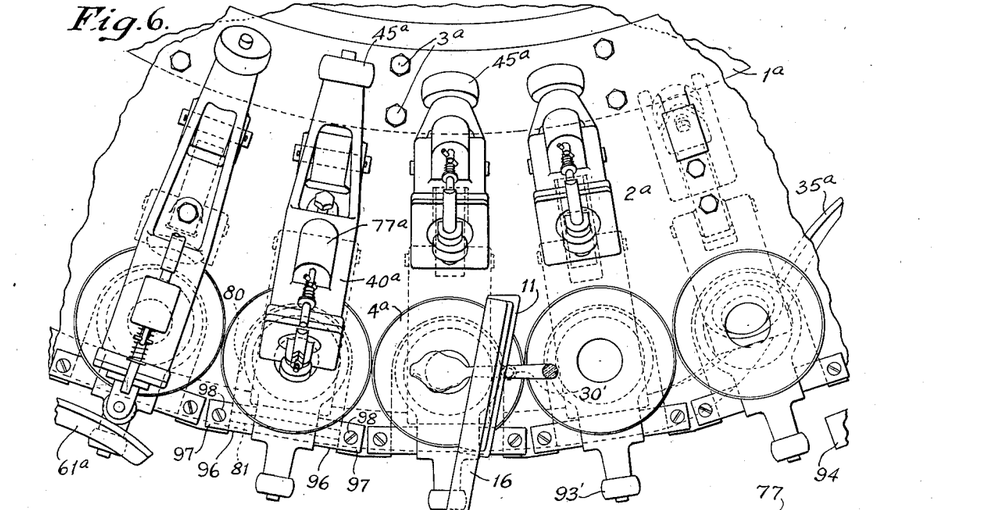
Fig. 6 is a view similar to Fig. 1, showing a modified form of apparatus embodying the invention.
Figures 7, 8:
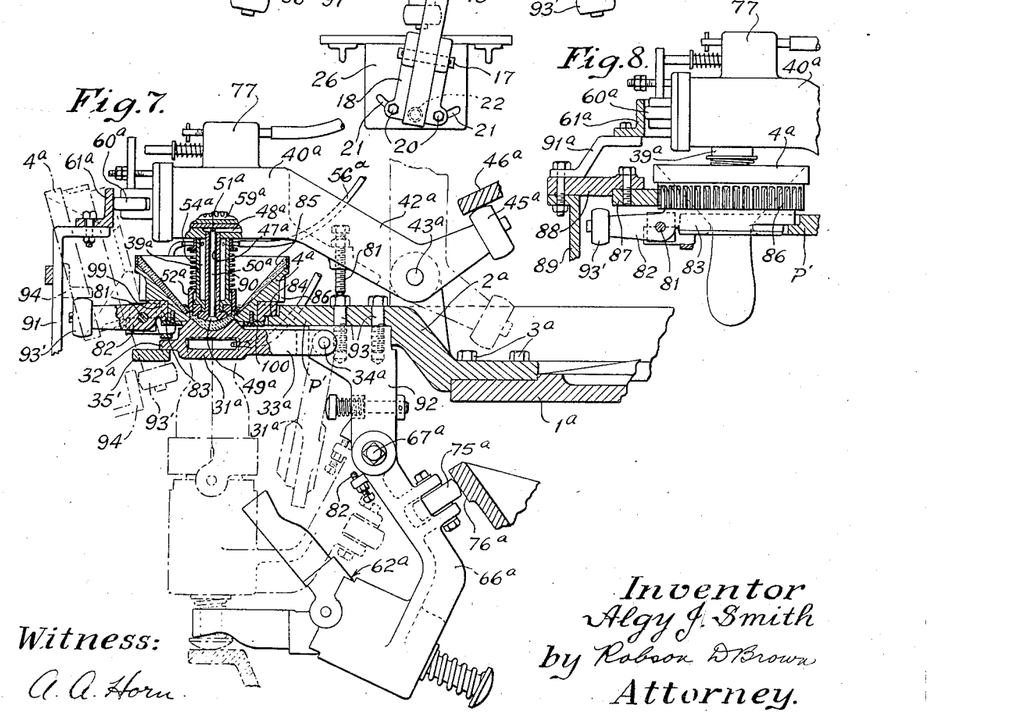
Fig. 7 is a view similar to Fig. 4, showing in full lines a funnel shaped supporting member, a blank mold and a combined press and blowhead in active positions and a blow mold in its inactive position and showing in dotted lines the active position of the blow mold and the inactive position of the blank mold.
Fig. 8 is a fragmentary view, partly in elevation and partly in vertical section, and illustrating particularly the means for rotating the funnel shaped supporting member of the modified form of construction shown in Figs. 6 and 7.

The modified form of machine shown in Figs. 6, 7 and 8 may comprise a rotary table 1a. An annular bracket plate 2a may be secured by bolts 3a or like fastening means to the edge portion of the table 1a. The bracket 2a has an upwardly offset substantially horizontal outer portion P′ provided with spaced cut-away portions 80 extending from its peripheral edge for part of its radial dimention. A transverse shaft 81 extends across the outer end of each cut-away portion 80 and supports an arm 82 which carries a ring shaped holder 83 in which a substantially funnel shaped supporting member 4a is removably and rotatably mounted. The shaft 81 may be fixed in its arm 82 and may have extending end portions journaled in bearing blocks 96 which have attaching portions 97 overlapping and secured by screws 98 (Fig. 6) to the bracket member P′, whereby the bearing blocks will be supported in the outer end of the cut-away portion 80 at opposite sides of the latter. The member 4a may be retained against accidental displacement from its holder by a downwardly facing shoulder 99 at the top of the holder and a removable retaining ring 100 at the bottom of the holder. The portion of the holder 83 within the inner part of the cut-away portion 80 is adapted to rest on an upwardly facing horizontal shoulder 84 at the inner end of the cut-away portion 80 when the holder 83 is in the position shown in Figs. 6 and 8 and by the full lines in Fig. 7. The member 4a may be lined at 85 with graphite or other suitable material as in the case of the member 4. A series of vertical gear teeth 86 extend around the outer periphery of the funnel member 4a and are adapted to be in mesh with teeth on the inner wall of an arcuate rack or segment 87 of an internal gear during part of the rotation of the table 1a, so as to rotate the member 4a in its holder for a purpose to be presently described. The rack or gear segment 87 may be carried by a supporting plate 88 at the upper end of suitable uprights, as at 89 in Fig. 8.

A combined press and blowhead 39a is provided for each member 4a and is carried by a cylinder 40a which is similar to the cylinder 40 and is carried by a bell crank lever 42a. The latter is fulcrumed at 43a on an upstanding lug or extension on the bracket 2a and carries a roll 45a for engaging with a cam rail 46a to move the combined press and blowhead 39a to and from cooperative relation with the associate member 4a at the proper times. The combined press and blowhead 39a has a central passage 47a in communication at its upper end with a passage 48a in the inner wall of the cylinder 40a. A valve 49a for closing the lower end of the passage 47a has a stem 50a extending slidably through the passage 47a. The stem 50a is prevented from moving downwardly out of the passage 47a by the contact of a transverse pin 51a with the upper end of the walls which define the passage 47a. A sealing sleeve 52a has limited sliding movement on the combined press and blowhead 39a and is urged downwardly to its lowest position on the latter by a spring 90, in which position it may be free to rotate on the blowhead 39a. The sealing sleeve 52a is adapted to function in substantially the same manner as the sealing sleeve 52 on the combined press and blowhead 39 and in addition may have the aforesaid rotary movement. The combined press and blowhead 39a is provided with an annular cooling space 54a to which a cooling fluid may be admitted through a tube 56a. A piston 59a is reciprocable in the cylinder 40a and is moved therein toward the right in Fig. 7 by the contact of a roll 60a on the piston rod with a cam rail 61a. The cam rail 61a is carried by supporting means which may include uprights such as indicated at 91 in Fig. 7 and brackets 91a on the supporting structure 89—88, as shown in Fig. 8. The cam actuated movement of the piston 59a will tend to force air from the cylinder 40a through the passage 48a into the passage 47a of the combined press and blowhead.

A blank mold 31a is provided for each member 4a. Such blank mold may be an integral part of a plate 32a which has arms 33a connected by horizontal pivot elements 34a with a bracket 92 that is secured by the fastening devices 93 to the lower side of the bracket member P'. The blank mold 31a may be identical in essential respects with and operated in the same manner as the blank mold 31 hereinbefore described, the outer end of the plate 32a sliding on a rail 35' which is identical in essential respects with the hereinbefore described rail 35.

The modified form of machine shown in Figs. 6, 7 and 8 also includes a blow mold 62a for each supporting member 4a. The blow mold 62a is supported and operated by mechanism which may be substantially the same as the hereinbefore described supporting and operating mechanism for the blow mold 62 except that the blow mold 62a need not be rotated when a parison is being blown therein. The supporting mechanism for the blow mold 62a comprises an arm 66a pivoted by a horizontal pivot element 67a to the lower end of the bracket 92 and carrying a roll 75a for cooperating with a cam rail 76a to swing the blow mold between its lower inactive position, as shown by full lines in Fig. 7, and its raised parison enclosing position as shown by the dotted lines in Fig. 7. Further description of the supporting and operating mechanism for the blow mold 62a is thought to be unnecessary, it of course being noted that such blow mold comprises two cooperative pivotally connected halves or sections which are closed about the parison when the blow mold is in its raised position, as shown by the dotted lines in Fig. 7, and are opened when the blow mold is in its lower inactive position, as shown by the full lines in Fig. 7.

The arm 82 carries a roll 93' adapted to cooperate with a cam rail 94 so as to swing the supporting member 4a upwardly and outwardly from the full line position of Fig. 7 to the dotted line position of the same figure at a certain time in the cycle of rotation of the table 1a to dump from such supporting member any glass remaining therein after a finally blown article has been detached from the supporting member, and then to guide the supporting member 4a downwardly and inwardly from its dotted line position to its full line position in Fig. 7 before such supporting member is brought again to a glass receiving position. The mechanism for severing the portion of a stream of glass that is deposited on each member 4a at the glass receiving station from the remainder of such stream is substantially the same for the modified form of apparatus as for the apparatus illustrated in Figs. 1 to 5 inclusive, and hereinbefore described in detail. Such mechanism therefore will not be again described nor will other parts of the modified form of apparatus which are identical in essential respects with corresponding parts of the first described apparatus, the same reference characters having been used whenever proper to indicate like parts of the two forms of apparatus shown in the drawings.

As soon as a portion of the glass stream has been deposited on the member 4a at the glass receiving station and has been severed from the supply stream, such severed portion of the glass stream or charge will begin to sag downwardly in the funnel shaped member 4a. At the proper time, the combined press and blowhead 39a is moved downwardly to position to press such glass into underlying blank mold 31a beneath the lower end of the glass supporting member 4a, as shown in Fig. 7, the sealing sleeve 52a being held against the inner wall of the member 4a by the spring 90 and the valve 49a being maintained in closed position by reason of its contact with the glass in the blank mold. At the proper time in the cycle of rotation of the mold table, the blank mold 31a is permitted to swing downwardly from its raised position, as shown by the full lines in Fig. 7, to its downwardly swung out-of-the-way position, as shown by the dotted lines in Fig. 7. At the time the glass parison has sagged sufficiently to permit opening of the valve 49a, the piston 59a is actuated to cause a regulable volume of air to be forced through the passages 48a and 47a into the parison, thereby imparting a bulbous shape to such parison. The blow mold 62a then is raised from the full line position of Fig. 7 to the dotted line position of the same figure and is closed about the parison. Finish blowing air is then supplied through the cylinder 40a and the combined press and blowhead to the parison in the blow mold and the parison is blown to final form. During the blowing of the parison in the blow mold, the gear teeth 86 mesh with the teeth of the internal gear segment or rack 87 so that the member 4a, the sleeve 52a and the glass parison that depends therefrom into the blow mold are rotated, the blow mold being stationary and a smooth finish thus being imparted to the outer surface of the article that is being blown. At the proper time in the cycle of rotation in the mold table, the blow mold is permitted to swing downwardly from the dotted line position of Fig. 7 to the full line position in the same figure and the finally blown article is detached from the supporting member 4a and is delivered to a suitable place. After the removal of the finished article from the member 4a, the roll 93' on the arm 82 contacts with a portion of the cam rail 94 that is so shaped and so located as to cause the member 4a to be swung from the upright position shown by the full lines in Fig. 7 to the tilted semi-inverted position shown by the dotted lines in Fig. 7 so that any glass remaining in the member 4a will be dumped therefrom at a suitable place for delivering such waste glass to a cullet pit. The continued contact of the roll 93' with the rail 94 causes the member 4a to swing to its downwardly swung position in a cutaway portion 80 of the bracket member P' so that such supporting member will again be in the proper position to receive a new charge of molten glass, as such supporting member is again brought by the rotation of the table 1 to the glass receiving station.

The apparatus shown and described herein are only two of many possible embodiments of the invention and it is to be understood that the various features of the invention may be modified as to structure, combination and arrangement to adapt the invention to different uses or different conditions of service without departing from the spirit and scope of the invention as set out in the appended claims.

I claim:

1. In the manufacture of hollow glassware, the method which comprises depositing the lower end portion of a downwardly moving stream of molten glass across an orifice in a moving support, severing the deposited glass from the remainder of the stream, anchoring the severed glass to the walls of the orifice, causing a portion of the severed glass to descend through the orifice, and shaping the glass below the orifice into an article of hollow glassware while said glass is still attached to said support.

2. In the manufacture of blown glassware, the method which comprises depositing the lower end portion of a downwardly moving stream of molten glass across an orifice in a moving support, severing the deposited glass from the remainder of the stream, anchoring the severed glass to the walls of the orifice, thereafter exerting pressure to cause a portion of the severed glass to descend through the orifice, imparting a preliminary shape to the glass descending through the orifice, and expanding said preliminarily shaped glass by fluid pressure applied through said orifice.

3. In the manufacture of blown glassware, the method which comprises depositing the lower end portion of a downwardly moving stream of molten glass across an orifice in a moving support, severing the deposited glass from the remainder of the stream, anchoring the severed glass to the walls of the orifice, thereafter exerting pressure to cause a portion of the severed glass to descend through the orifice, receiving the glass descending through said orifice in a blank mold, removing the blank mold, directing fluid under pressure through said orifice into the glass below the orifice, closing a blow mold about said glass, and blowing the glass to final form in said blow mold by fluid pressure applied through said orifice.

4. In the manufacture of blown glassware, the method which comprises moving a series of apertured supporting members successively beneath successive lower end portions of a downwardly moving continuous stream of molten glass so that each of said successive lower end portions of the stream will be deposited across the aperture of a supporting member, severing each deposited end portion of the stream from the remainder of the stream, anchoring the severed glass to the walls of the orifice, thereafter exerting pressure to cause a portion of the glass deposited on each supporting member to descend through the aperture thereof, and shaping the glass below the aperture of each of said supporting members into an article of blown glassware while said glass is still attached to said support.

5. In the manufacture of blown glassware, the method which comprises moving a series of apertured supporting members successively beneath successive lower end portions of a downwardly moving continuous stream of molten glass so that each of said successive lower end portions of the stream will be deposited across the aperture of a supporting member, severing each deposited end portion of the stream from the remainder of the stream, anchoring the severed glass to the walls of the orifice, thereafter exerting pressure to cause a portion of the glass deposited on each supporting member to descend through the aperture thereof, directing fluid under pressure downwardly through said orifice into the descending glass, receiving the glass below each aperture in a blow mold, and expanding said glass in said blow mold by fluid pressure applied through said aperture.

6. In the manufacture of blown glassware, the method which comprises depositing the lower end portion of a downwardly moving stream of molten glass across an orifice in a moving support, severing the deposited glass from the remainder of the stream, anchoring the severed glass to the walls of the orifice, thereafter exerting pressure to cause a portion of the severed glass to descend through the orifice, receiving the glass below the orifice in a blow mold, expanding the glass in the blow mold by fluid pressure applied through said orifice, and causing relative rotary movement of the glass in said mold and during part of the time that said glass is being expanded in the mold.

7. In the manufacture of blown glassware, the method which comprises depositing the lower end portion of a downwardly moving stream of molten glass across an orifice in a moving support, severing the deposited glass from the remainder of the stream, anchoring the severed glass to the walls of the orifice, thereafter exerting pressure to cause a portion of the severed glass to descend through the orifice, receiving the glass below the orifice in a blow mold, expanding the glass in the blow mold by fluid pressure applied through said orifice, and rotating said glass in said blow mold while said glass is being expanded by said fluid pressure.

8. In the manufacture of blown glassware, the method which comprises moving a series of spaced apertured supporting members along a path intersecting the line of flow of a downwardly moving stream of molten glass so that successive lower end portions of said stream will be laid across successive supporting members as such supporting members are moved past the line of flow of said stream, severing the glass on each supporting member from the remainder of the stream as such glass is moved away from the line of flow of the stream, supporting the fresh lower end of the stream by an upwardly directed blast of pressure fluid in the interim between each severing operation and the movement of the succeeding supporting member to position to support said lower end of the stream, causing a portion of the severed glass on each supporting member to descend through the aperture of such supporting member, and shaping the glass descending through the aperture of such supporting member into an article of hollow glassware while such glass is still attached to the supporting member.

9. Apparatus for shaping hollow glassware comprising a plurality of supporting members, each having an aperture provided therein, means for moving said supporting members successively through the line of flow of a downwardly moving stream of molten glass from a source of supply so that successive portions of said stream will be laid across the apertures of the successive supporting members, means for severing the glass deposited on each supporting member from the remainder of the stream, and separate means operating initially after the severance for cooperating with each of said supporting members to form the glass deposited thereon into an article of blown glassware while such glass is attached to the supporting member.

10. Apparatus for shaping hollow glassware comprising a continuously moving carrier, a plurality of supporting members mounted on said carrier and each having an orifice provided therein, said supporting members being movable with said carrier successively beneath successive lower ends of a downwardly moving continuous stream of molten glass from a source of supply, a stationary shearing member located adjacent to the line of flow of said stream in position to cooperate with an edge of each supporting member when the supporting member has moved past the line of flow of said stream after receiving a portion of glass from the stream for severing such portion of glass from the remainder of the stream, and means for cooperating with each of said supporting members to form the severed glass on such supporting member into an article of blown glassware while such glass remains attached to the supporting member.

11. Apparatus for making blown glassware comprising a rotary support, a plurality of funnel shaped supporting members carried by said rotary support in position to be brought successively to a position beneath successive lower ends of a downwardly moving stream of molten glass during a rotation of said rotary support, whereby a portion of said stream of glass will be deposited on each funnel shaped supporting member in its turn, means for severing the glass deposited on each supporting member from the remainder of the stream prior to any forming operation upon the glass so severed, a blank mold and a blow mold associated with each of said supporting members, means for bringing said blank mold and said blow mold successively to and from glass receiving positions beneath the funnel shaped supporting member, and a combined press and blow head associated with each funnel shaped supporting member and cooperating therewith after the glass thereon has been severed from said stream for pressing a portion of the glass deposited on such supporting member downward through such supporting member into the blank mold and for directing pressure fluid through the supporting member into the glass below the latter prior to and during the time that such glass is received in said blow mold.

12. In apparatus for the manufacture of blown glassware, a supporting member having an orifice therein, means for causing a portion of a continuous stream of molten glass to be deposited across the orifice of said supporting member, means for severing the deposited glass from the remainder of the stream, a combined press and blowhead constructed and arranged to enter said orifice from above to cause a portion of the glass thus severed to descend through said orifice, a blank mold for temporarily supporting the glass descending through the orifice, a blow mold for subsequently receiving the glass below the orifice, and means for supplying pressure fluid through said combined press and blowhead to the glass in said blow mold to expand said glass.

13. In apparatus for the manufacture of blown glassware, a supporting member having an orifice therein, means for causing a portion of a continuous stream of molten glass to be deposited across the orifice of said supporting member, means for severing the deposited glass from the remainder of the stream, a combined press and blowhead constructed and arranged to enter said orifice from above after the severance to cause a portion of the severed glass to descend through said orifice, a blank mold for temporarily supporting the glass descending through the orifice, a blow mold for subsequently receiving the glass below the orifice, means for supplying pressure fluid through said combined press and blowhead to the glass in said blow mold to expand said glass, and means for causing a relative rotary movement of the blow mold and the glass therein during the expansion of said glass in the blow mold.

14. In apparatus for the manufacture of blown glassware, a supporting member having an orifice therein, means for causing a portion of a continuous stream of molten glass to be deposited across the orifice of said supporting member, means for severing the deposited glass from the remainder of the stream, a combined press and blowhead constructed and arranged to enter said orifice from above after the severance to cause a portion of the severed glass to descend through said orifice, a blank mold for temporarily supporting the glass descending through the orifice, a blow mold for subsequently receiving the glass below the orifice, means for supplying pressure fluid through said combined press and blowhead to the glass in said blow mold to expand said glass, and means for rotating the supporting member and the glass in the blow mold during part of the time that said glass is being expanded in the blow mold.

15. In glass working apparatus, the combination with means for feeding molten glass downwardly in a continuous stream, of a shear blade supported adjacent to the line of flow of the stream, a plurality of supporting members, each adapted to support a portion of said stream until it is formed into an article of hollow glassware, means for continuously moving said supporting members past a position to receive a portion of said stream and then in wiping contact with said shear blade to sever from said stream the glass so received, and means for cooperating with said supporting member to form part of the glass received thereby into an article of hollow glassware.

16. In glass working apparatus, the combination with means for feeding molten glass downwardly in a continuous stream, of a vertically disposed continuously moving glass supporting funnel member movable horizontally across the line of flow of said stream so as to intercept and support the lower end portion of the stream until it is formed into an article of hollow glassware, a shear member for cooperating with an upper edge portion of said funnel member to sever the glass on the latter from the remainder of the stream when the funnel member has moved completely past the line of flow of the stream and means separate from said shear member for shaping at least a portion of the severed glass into a desired shape subsequent to the severance.

17. In glass working apparatus, the combination with means for feeding molten glass downwardly in a continuous stream, of a vertically disposed glass supporting funnel member movable horizontally across the line of flow of said stream so as to intercept and support the lower end portion of the stream, and a shear member for cooperating with an upper edge portion of said funnel member to sever the glass supported by the latter from the remainder of the stream when the funnel member has moved completely past the line of flow of the stream, said funnel having diametrically opposite internal depressions adjacent to its upper edge adapted to receive portions of the glass stream at opposite sides of the funnel cavity so as to permit the glass supported by the funnel to be severed cleanly from the remainder of the stream without smearing and without displacement of such glass.

18. In glass working apparatus, the combination with means for feeding molten glass downwardly in a continuous stream, of a vertically disposed glass supporting funnel member movable horizontally across the line of flow of said stream so as to intercept and support the lower end portion of the stream until it is formed into an article of hollow glassware, a shear member for cooperating with an upper edge portion of said funnel member to sever the glass supported by the latter from the remainder of the stream when the funnel member has moved completely past the line of flow of the stream, a pivoted holder for said shear member, and spring pressed means for actuating said holder to maintain said shear member yieldingly in close contact with the upper edge of the funnel member as the latter receives its quota of glass from said stream.

19. In glass working apparatus, the combination with means for feeding molten glass downwardly in a continuous stream, of a vertically disposed glass supporting funnel member movable horizontally across the line of flow of said stream so as to intercept and support the lower end portion of the stream, a combined press and blowhead movable from above into pressing relation with the glass in the funnel member, said head having a longitudinal passage therethrough adapted for connection with a source of pressure fluid supply, a valve movable by contact with the glass in the funnel to position to close the lower end of said passage and movable automatically to open position when the glass in the funnel sags out of contact with the valve, and a spring pressed siding sealing sleeve on said head yieldingly maintained in position to prevent upward movement of glass between said head and the funnel when said head is in glass pressing position in the funnel.

20. Glass working apparatus comprising a carrier mounted for rotation about a vertical axis, a plurality of arms supported on said carrier for swinging movement about substantially horizontal axes, a substantially funnel shaped rotatable glass supporting member supported by each of said arms, means for delivering molten glass to said funnels successively and for fabricating part of the glass delivered to each funnel member into an article of hollow glassware during each cycle of rotation of the carrier, means for maintaining each arm substantially horizontal while glass is fed to the funnel member thereon and while part of such glass is being fabricated into an article of glassware, means for then swinging each arm about its horizontal pivotal axis to dump from the funnel member thereon the glass remaining after a glassware fabricating operation, and means for rotating each of said funnels and the glass supported thereby during part of the time that an article of glassware is being fabricated from such glass.

Signed at Hartford, Connecticut, this 1st day of June, 1928.

ALGY J. SMITH.